(12) United States Patent
Liu

(10) Patent No.: US 10,148,098 B2
(45) Date of Patent: *Dec. 4, 2018

(54) INDUCTOR-BASED ACTIVE BALANCING FOR BATTERIES AND OTHER POWER SUPPLIES

(71) Applicant: Texas Instruments Incorporated, Dallas, TX (US)

(72) Inventor: Qingguo Liu, San Ramon, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 60 days.

This patent is subject to a terminal disclaimer.

(21) Appl. No.: 14/954,556

(22) Filed: Nov. 30, 2015

(65) Prior Publication Data
US 2016/0141895 A1  May 19, 2016

Related U.S. Application Data

(63) Continuation of application No. 13/644,664, filed on Oct. 4, 2012, now Pat. No. 9,203,121.

(60) Provisional application No. 61/546,408, filed on Oct. 12, 2011, provisional application No. 61/546,713, filed on Oct. 13, 2011.

(51) Int. Cl.
*H02J 7/00* (2006.01)
*H01M 10/44* (2006.01)
*H01M 10/42* (2006.01)

(52) U.S. Cl.
CPC ......... *H02J 7/0016* (2013.01); *H01M 10/441* (2013.01); *H02J 7/007* (2013.01); *H01M 2010/4271* (2013.01); *Y10T 307/685* (2015.04)

(58) Field of Classification Search
CPC ......... H01M 10/441; H01M 2010/4271; H02J 7/0016; H02J 7/007; Y10T 307/685

USPC ................ 307/38, 77; 320/118, 121; 345/63
See application file for complete search history.

(56) References Cited

U.S. PATENT DOCUMENTS

| | | |
|---|---|---|
| 7,629,949 B2 | 12/2009 | Yang |
| 7,817,446 B2 | 10/2010 | Endo et al. |
| 2002/0075700 A1 | 6/2002 | Birumachi |
| 2007/0001651 A1 | 1/2007 | Harvey |

(Continued)

FOREIGN PATENT DOCUMENTS

| | | |
|---|---|---|
| CN | 1573861 A | 2/2005 |
| KR | 1020100126235 A | 12/2010 |

OTHER PUBLICATIONS

Search Report, dated Nov. 16, 2015.

(Continued)

*Primary Examiner* — Hal Kaplan
(74) *Attorney, Agent, or Firm* — Andrew Viger; Charles A. Brill; Frank D. Cimino

(57) ABSTRACT

A system includes multiple power supplies connected in series and an active balancing circuit. The active balancing circuit includes an LC resonance circuit and multiple switches configured to selectively couple different ones of the power supplies to the LC resonance circuit. The LC resonance circuit includes an inductor, a capacitor, and an additional switch. The inductor is configured to store energy to be transferred between two or more of the power supplies. The additional switch is configured to selectively create a resonance between the inductor and the capacitor in order to reverse a direction of a current flow through the inductor. The active balancing circuit can transfer energy between individual power supplies or groups of power supplies.

18 Claims, 8 Drawing Sheets

(56) References Cited

U.S. PATENT DOCUMENTS

| | | |
|---|---|---|
| 2009/0096516 A1 | 4/2009 | Nakashima |
| 2009/0189448 A1 | 7/2009 | Verschueren |
| 2011/0316344 A1 | 12/2011 | Van Lammeren |
| 2013/0093395 A1 | 4/2013 | Liu |

OTHER PUBLICATIONS

Chinese Office Action , Application No. 201280050359.9, dated Nov. 16, 2015.
Gabriel A. Rincon-Mora, "Accurate and Lossless Current-Sensing Techniques for Power Applications—A Practical Myth?", Mar. 16, 2005, EE Times.

INDUCTOR-BASED ACTIVE BALANCING FOR BATTERIES AND OTHER POWER SUPPLIES

CROSS-REFERENCE TO RELATED APPLICATIONS AND PRIORITY CLAIM

This application is a continuation of U.S. patent application Ser. No. 13/644,664, filed Oct. 4, 2012 (U.S. Pat. No. 9,203,121, which claims priority under 35 U.S.C. § 119(e) to Provisional Patent Application No. 61/546,408 filed on Oct. 12, 2011 and U.S. Provisional Patent Application No. 61/546,713, filed on Oct. 13, 2011, which are hereby incorporated by reference for all purposes.

TECHNICAL FIELD

This disclosure is generally directed to power supply balancing systems. More specifically, this disclosure is directed to inductor-based active balancing for batteries and other power supplies.

BACKGROUND

Modern batteries often include multiple battery cells connected in series, and multiple batteries can be connected in series to form a battery module. Unfortunately, the actual output voltage provided by each individual battery cell in a battery or each battery in a battery module may vary slightly. This can be caused by any number of factors, such as manufacturing variations, temperature variations, or other internal or external factors. This can cause problems during charging and discharging of the battery cells or batteries. In some systems, voltage detection circuitry can be used to determine the output voltage of each battery cell or battery, and a voltage balancing system can be used to compensate for variations in the output voltages.

Consider battery cells connected in series, where each battery cell is designed to provide an output voltage of 3.8V. Voltage detection circuitry may determine that one of the battery cells actually has an output voltage of 3.9V. A conventional passive voltage balancing system typically includes resistors that dissipate electrical energy from battery cells or batteries having excessive output voltage. In this example, the dissipation of electrical energy causes the 3.9V output voltage to drop to the desired level of 3.8V. However, since electrical energy is dissipated using the resistors, this can result in significant energy being lost from the battery cell, which shortens the operational life of the battery.

SUMMARY

This disclosure provides inductor-based active balancing for batteries and other power supplies.

In a first embodiment, an apparatus includes an LC resonance circuit and multiple switches configured to selectively couple different power supplies connected in series to the LC resonance circuit. The LC resonance circuit includes an inductor, a capacitor, and an additional switch. The inductor is configured to store energy to be transferred between two or more of the power supplies. The additional switch is configured to selectively create a resonance between the inductor and the capacitor in order to reverse a direction of a current flow through the inductor.

In a second embodiment, a method includes transferring energy from at least one first power supply to an inductor. The method also includes selectively creating a resonance between the inductor and a capacitor in order to reverse a direction of a current flow through the inductor. The method further includes transferring the energy from the inductor to at least one second power supply. The at least one first power supply and the at least one second power supply are connected in series.

In a third embodiment, a system includes multiple power supplies connected in series and an active balancing circuit. The active balancing circuit includes an LC resonance circuit and multiple switches configured to selectively couple different ones of the power supplies to the LC resonance circuit. The LC resonance circuit includes an inductor, a capacitor, and an additional switch. The inductor is configured to store energy to be transferred between two or more of the power supplies. The additional switch is configured to selectively create a resonance between the inductor and the capacitor in order to reverse a direction of a current flow through the inductor.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
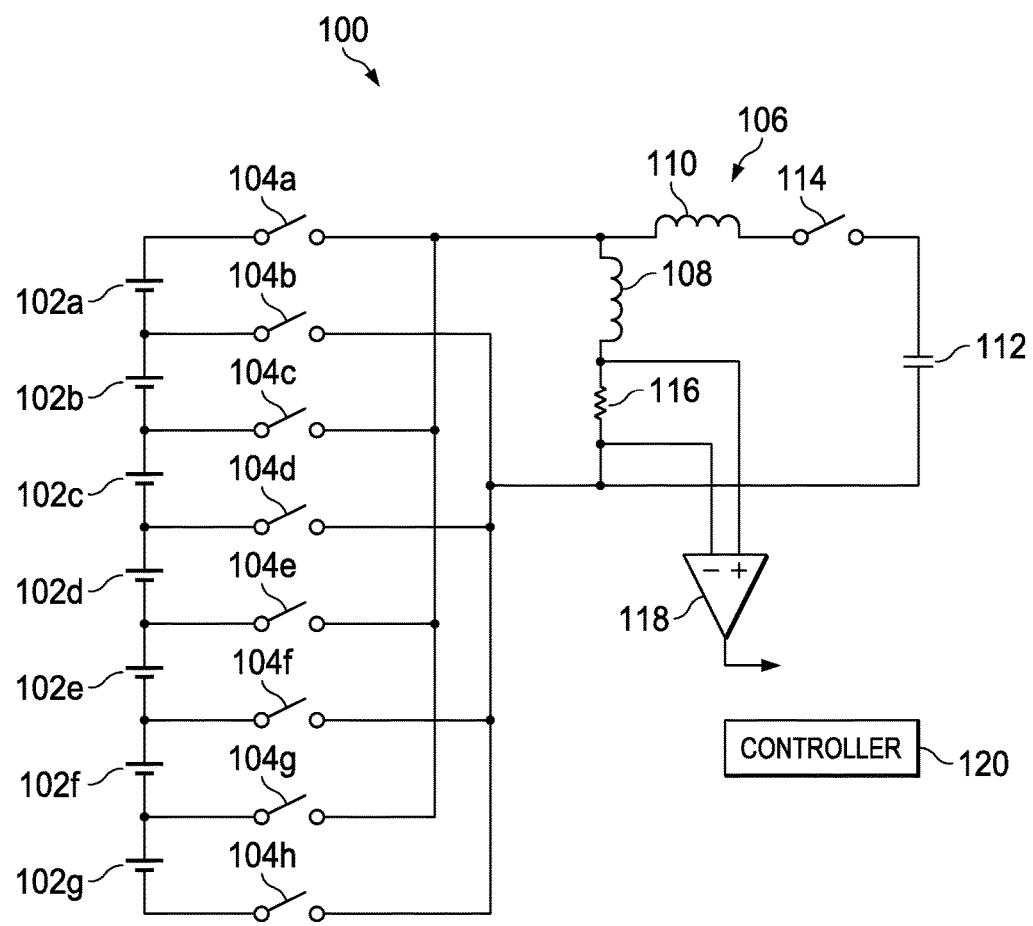
FIG. 1 illustrates an example inductor-based active balancing system for batteries and other power supplies in accordance with this disclosure.

FIG. 1 illustrates an example inductor-based active balancing system 100 for batteries and other power supplies in accordance with this disclosure. As shown in FIG. 1, the system 100 includes or is coupled to multiple power supplies 102a-102g connected in series. Each power supply 102a-102g represents any suitable source of power, such as a single battery cell. In particular embodiments, each power supply 102a-102g represents a single battery cell having a nominal voltage of 3.2V. However, each power supply 102a-102g could also represent multiple battery cells, a battery module, multiple battery modules, or other collection of battery cells. Any other types of power supplies could also be used, such as super-capacitors, fuel cells, and solar cells. Also note that any number of power supplies could be used here.

Multiple switches 104a-104h are coupled to the power supplies 102a-102g. The switches 104a-104h are opened and closed to transfer energy between selected power supplies 102a-102g via an inductor in an inductor-capacitor (LC) resonance circuit 106. The switches 104a-104h represent any suitable switching devices, such as transistors. In particular embodiments, each of the switches 104a-104h represents two back-to-back MOSFET transistors to prevent the short-circuit of two neighboring cells by the MOSFET body diode. Any single-switch devices with no body diodes can also be used here.

The LC resonance circuit 106 transfers energy between the selected power supplies 102a-102g. In this example, the LC resonance circuit 106 includes a first inductor 108, a second inductor 110, and a capacitor 112. As can be seen in FIG. 1, one end of the inductor 108 is connected to a first subset of the switches 104a-104h, and another end of the inductor 108 is connected to a second subset of the switches 104a-104h.

Each inductor 108-110 includes any suitable inductive structure having any suitable inductance. The inductance of the inductor 110 can be less (possibly much less) than the inductance of the inductor 108. In particular embodiments, the inductor 108 could have an inductance of 33 µH, and the inductor 110 could have an inductance of 1 µH. The capacitor 112 includes any suitable capacitive structure having any suitable capacitance. In particular embodiments, the capacitor 112 could have a capacitance of 1 µF.

A switch 114 is coupled in series with the inductor 110 and with the capacitor 112. The switch 114 is used to selectively create a current path through the inductor 110 and the capacitor 112, thereby selectively controlling LC resonance in the circuit 106. The switch 114 represents any suitable switching device, such as at least one bi-directional transistor. In particular embodiments, the switch 114 represents two back-to-back MOSFET transistors.

A sense resistor 116 is coupled in series with the inductor 108 and to an amplifier 118. The inductor 108 and the sense resistor 116 are also coupled in parallel to the inductor 110, the capacitor 112, and the switch 114. A voltage across the sense resistor 116 varies depending on the current through the inductor 108. The sense resistor 116 includes any suitable resistive structure having any suitable resistance (typically a very small resistance). In particular embodiments, the sense resistor 116 could have a resistance of 0.1Ω. The amplifier 118 includes any suitable structure for amplifying a signal across a sense resistor, such as an LMP8601 amplifier from TEXAS INSTRUMENTS INC. or other high common-mode voltage precision current sensing amplifier.

A controller 120 controls the overall operation of the system 100. For example, the controller 120 could receive signals from the amplifier 118. The controller 120 could also control the operation of the switches 104a-104h, 114 to control the charging and discharging of the power supplies 102a-102g. The controller 120 includes any suitable structure for controlling the charging and discharging of power supplies. For instance, the controller 120 could include a pulse width modulation (PWM) controller that generates control signals for the various switches, where the control signals have variable duty cycles controlled using PWM.

As described in more detail below, energy can be transferred from one or more of the power supplies 102a-102g to one or more other of the power supplies 102a-102g through the inductor 108. For example, energy can be discharged from one or more of the power supplies 102a-102g and stored in the inductor 108, and that energy can then be transferred to one or more other of the power supplies 102a-102g. If necessary, the direction of current flow through the inductor 108 can be reversed using a resonance created between the inductors 108-110 and the capacitor 112, allowing the transfer of energy between any of the power supplies.

In this way, the system 100 provides a novel and robust active balancing architecture. Direct balancing of energy can occur between power supplies without the need for an energy buffer (such as a transformer). This leads to higher balancing efficiency, such as up to 85% efficiency or more. Moreover, this active balancing approach represents an extremely low-cost solution since it uses one switch-pair per channel (power supply) and one larger inductor (inductor 108) per collection of power supplies. In addition, the system 100 provides more flexibility for system-level algorithms in that it can support a wide variety of multiple-supply charging/discharging algorithms.

In the system 100 of FIG. 1, a distinction can be made between odd and even power supplies 102a-102g. Here, "odd" and "even" refer to the number assigned to the power supplies when they are numbered in series. In this example, power supplies 102a, 102c, 102e, and 102g could represent "odd" power supplies, and power supplies 102b, 102d, and 102f could represent "even" power supplies. This distinction is used since some energy transfers involve the use of the capacitor 112 while other energy transfers do not. In particular, power transfers from an odd-numbered power supply to an odd-numbered power supply ("odd-to-odd" transfers) and power transfers from an even-numbered power supply to an even-numbered power supply ("even-to-even" transfers) involve the capacitor 112. Power transfers from an odd-numbered power supply to an even-numbered power supply ("odd-to-even" transfers) and power transfers from an even-numbered power supply to an odd-numbered power supply ("even-to-odd" transfers) do not involve the capacitor 112.

Although FIG. 1 illustrates one example of an inductor-based active balancing system 100 for batteries and other power supplies, various changes may be made to FIG. 1. For example, any suitable number(s), type(s), and arrangement(s) of power supplies could be used in the system 100. Also, various components in FIG. 1 could be rearranged as desired, such as by placing the switch 114 on the other side of the inductor 110. Further, additional components could be added to the system 100 according to particular needs. For instance, a 1 nF or other capacitor could be coupled between the line joining the odd-numbered switches and ground, and a 300 pF or other capacitor could be coupled between the line joining the even-numbered switches and ground. In addition, while specific circuit components are shown, other circuit components for performing the same or similar function(s) could be used.

Figure 2A:
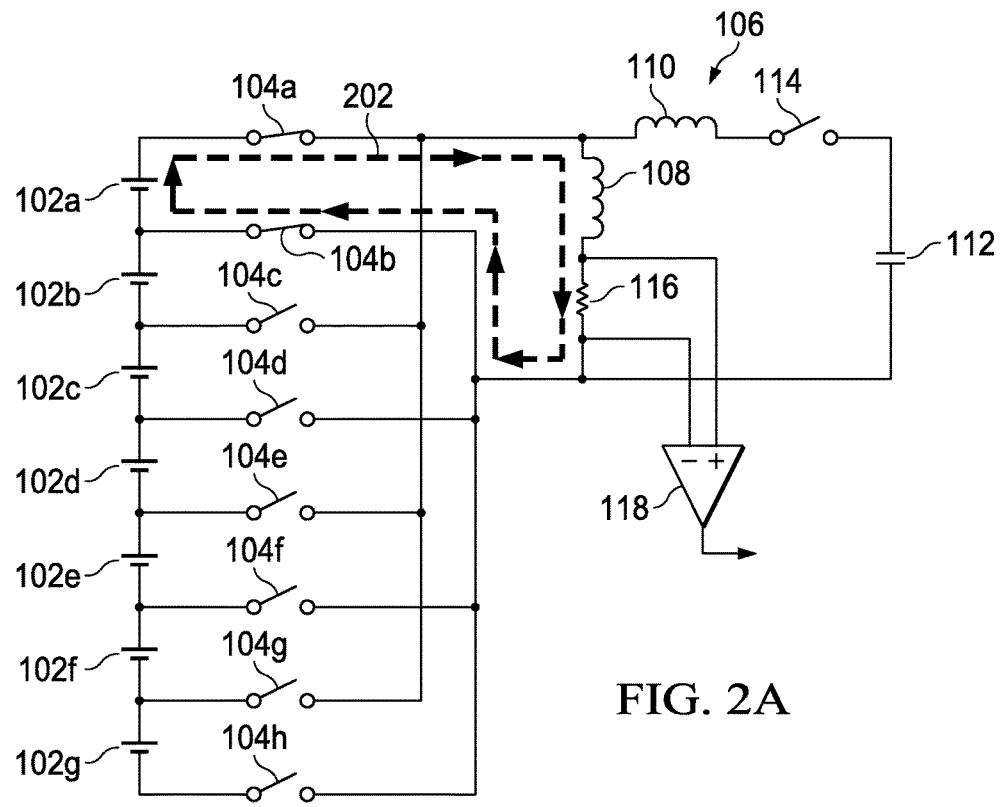
FIGS. 2A and 2B illustrate example operations of the system of FIG. 1 during odd-to-even and even-to-odd power transfers in accordance with this disclosure.
Figure 2B:
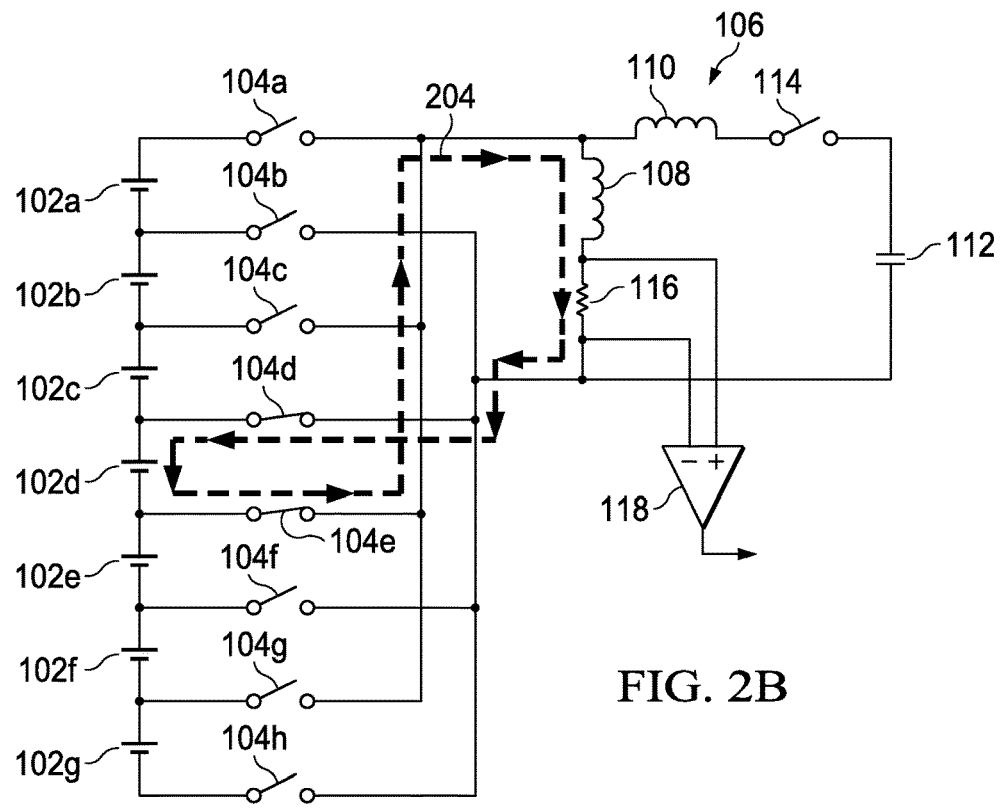

FIGS. 2A and 2B illustrate example operations of the system 100 of FIG. 1 during odd-to-even and even-to-odd power transfers in accordance with this disclosure. In this particular example, a power transfer is occurring from power supply 102a to power supply 102d, making it an odd-to-even transfer. Similar operations may occur during an even-to-odd transfer. The opening and closing of the switches 104a-104h here is controlled by the controller 120.

As shown in FIG. 2A, in order to transfer energy out of the power supply 102a, two switches 104a-104b are closed, while the remaining switches 104c-104h are opened. This creates a current path 202 through the power supply 102a. Also, the switch 114 is opened to disconnect the capacitor 112 from the current path 202. This causes current to flow from the connected power supply 102a to the inductor 108, charging the inductor 108.

As shown in FIG. 2B, in order to transfer energy from the inductor 108 to the power supply 102d, two switches 104d-104e are closed, while the remaining switches 104a-104c, 104f-104h are opened. This creates a current path 204 through the power supply 102d. Also, the switch 114 remains opened. This causes current to flow from the inductor 108 to the connected power supply 102d, charging that power supply 102d. Note here that the currents through the inductor 108 flow in the same direction in FIGS. 2A and 2B.

FIGS. 3A through 3D illustrate example operations of the system 100 of FIG. 1 during odd-to-odd and even-to-even power transfers in accordance with this disclosure. In this particular example, a power transfer is occurring from power supply 102a to power supply 102c, making it an odd-to-odd transfer. Similar operations may occur during an even-to-even transfer. The opening and closing of the switches 104a-104h here is controlled by the controller 120.

Figure 3A:
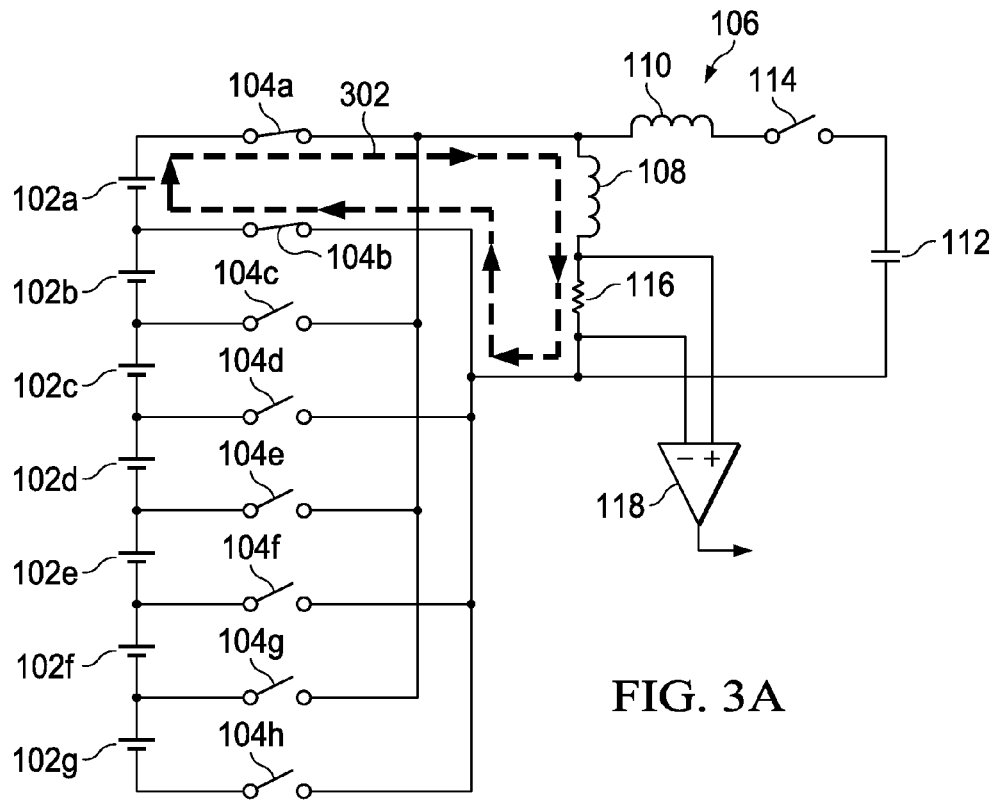
FIGS. 3A through 3D illustrate example operations of the system of FIG. 1 during odd-to-odd and even-to-even power transfers in accordance with this disclosure.

As shown in FIG. 3A, in order to transfer energy out of the power supply 102a, two switches 104a-104b are closed, while the remaining switches 104c-104h are opened. This creates a current path 302 through the power supply 102a. Also, the switch 114 is opened to disconnect the capacitor 112 from the current path 302. This causes current to flow from the connected power supply 102a to the inductor 108, charging the inductor 108.

Figure 3B:
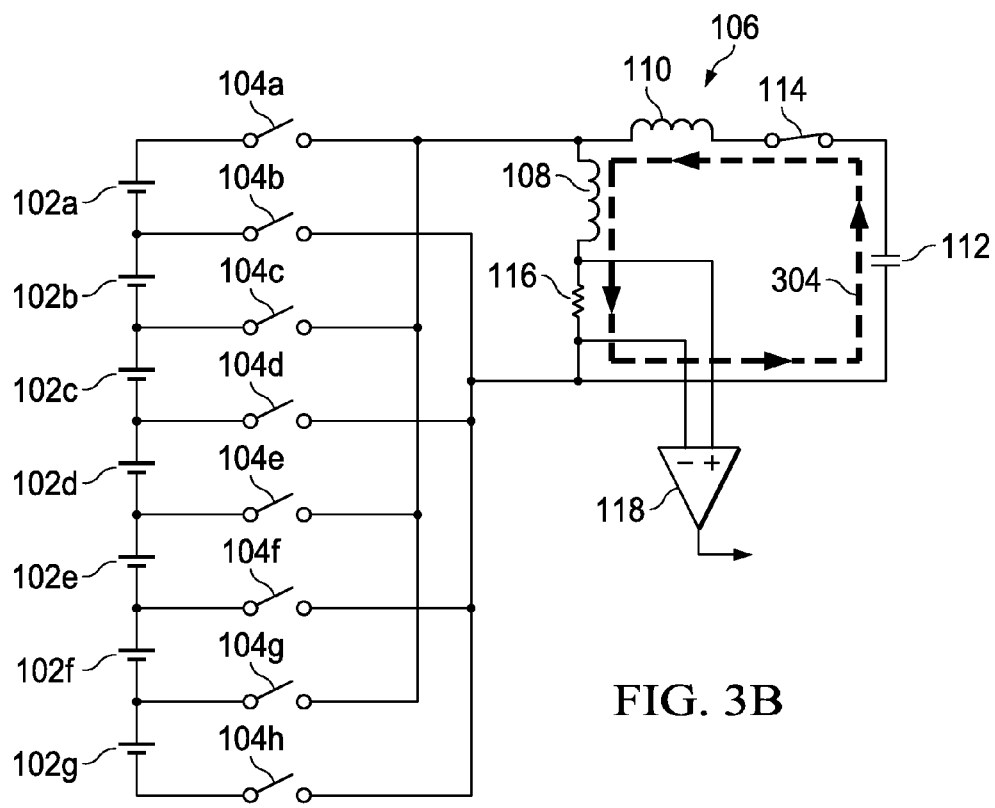

As shown in FIG. 3B, all of the switches 104a-104h are opened, and the switch 114 is closed. This causes current to flow from the inductor 108 to the capacitor 112 as part of a current flow 304. This current flow 304 transfers at least some of the energy stored on the inductor 108 to the capacitor 112.

Figure 3C:
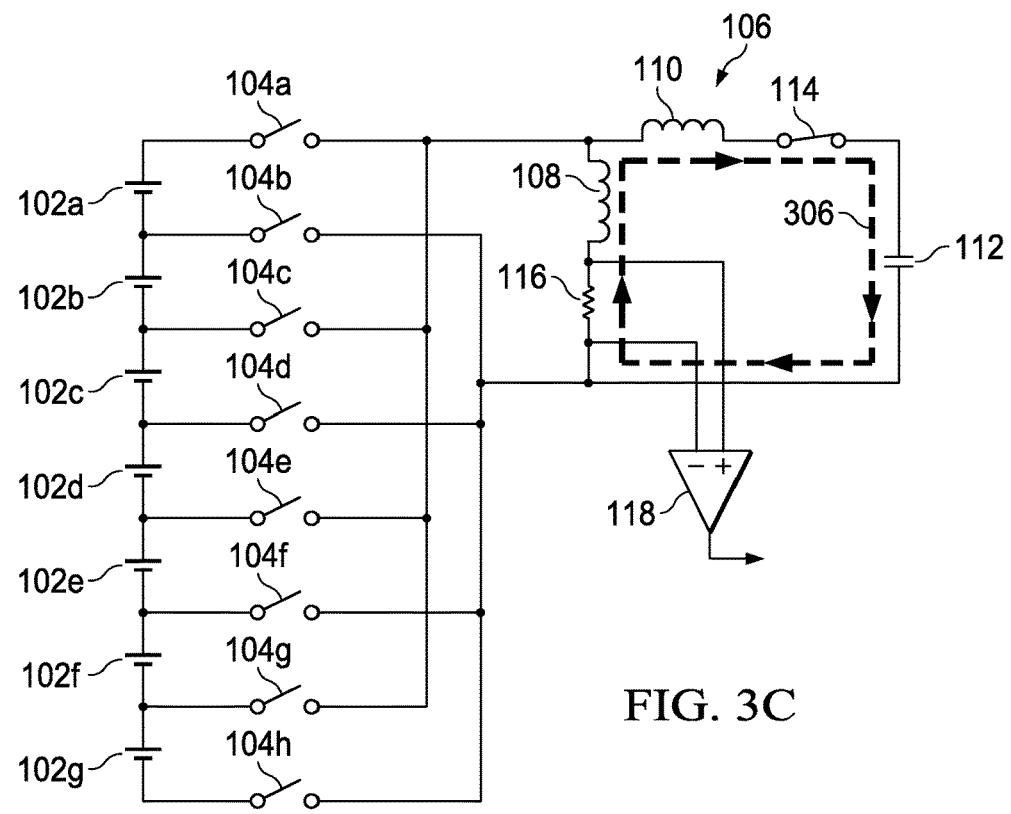

As shown in FIG. 3C, all of the switches 104a-104h remain opened, and the switch 114 remains closed. This causes current to flow from the capacitor 112 to the inductor 108 during resonance as part of a current flow 306. After half of the resonate cycle time, the combined effect of the resonance in FIGS. 3B and 3C is to reverse the direction of current flow through the inductor 108.

Figure 3D:
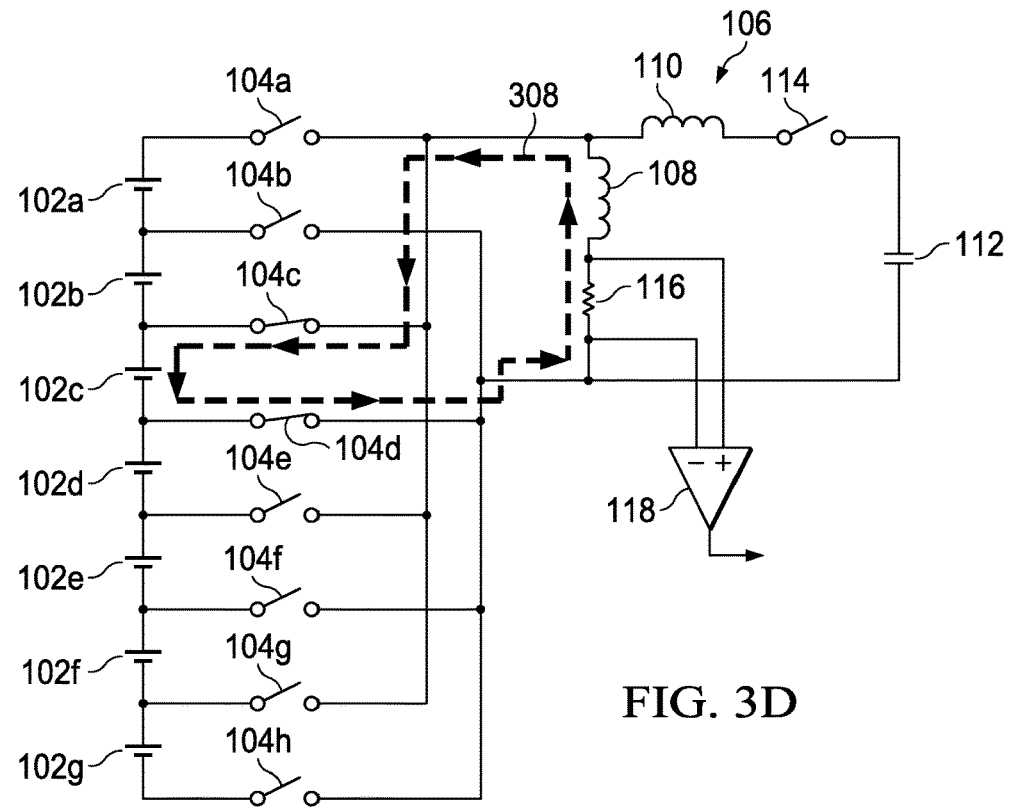

As shown in FIG. 3D, in order to transfer energy from the inductor 108 to the power supply 102c, two switches 104c-104d are closed, while the remaining switches 104a-104b, 104e-104h are opened. This creates a current path 308 through the power supply 102c. Also, the switch 114 is opened. This causes current to flow from the inductor 108 to the connected power supply 102c, charging that power supply 102c. However, the current flows in the opposite direction through the inductor 108 than in FIG. 3A.

Note that while FIGS. 2A through 3D have dealt with the transfer of energy from a single power supply to a single power supply, transfers involving discharges from multiple power supplies and/or charges of multiple power supplies can also be performed.

Figure 4A:
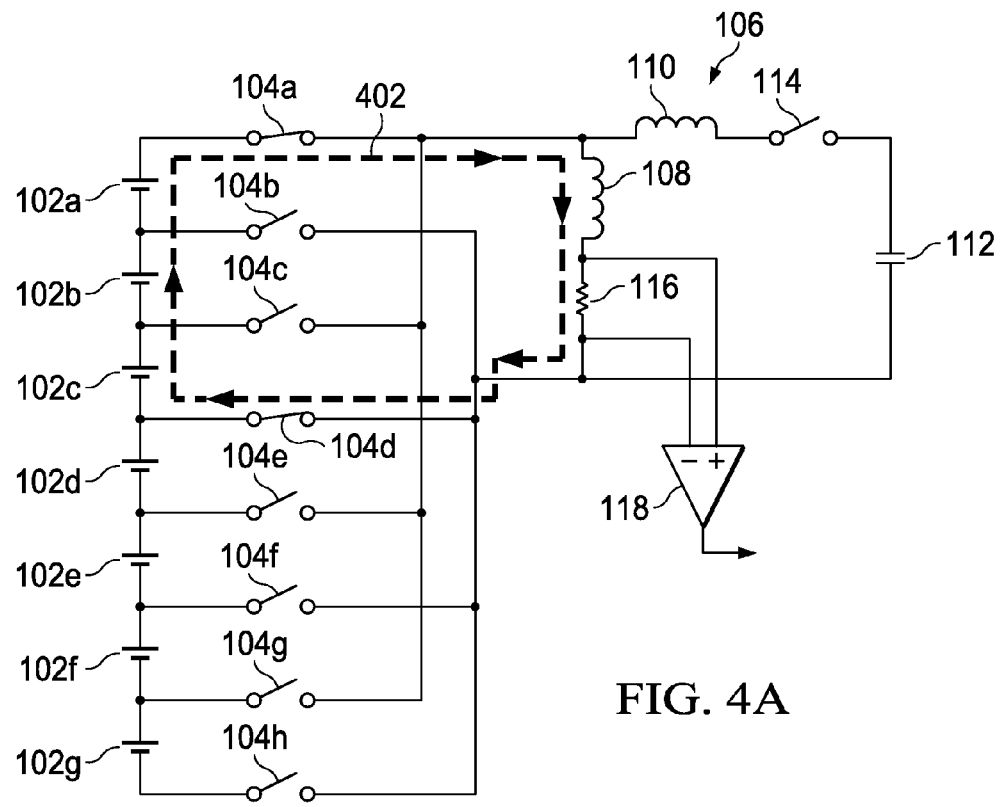
FIGS. 4A and 4B illustrate example operations of the system of FIG. 1 during power transfers involving multiple discharged power supplies and multiple charged power supplies in accordance with this disclosure.
Figure 4B:
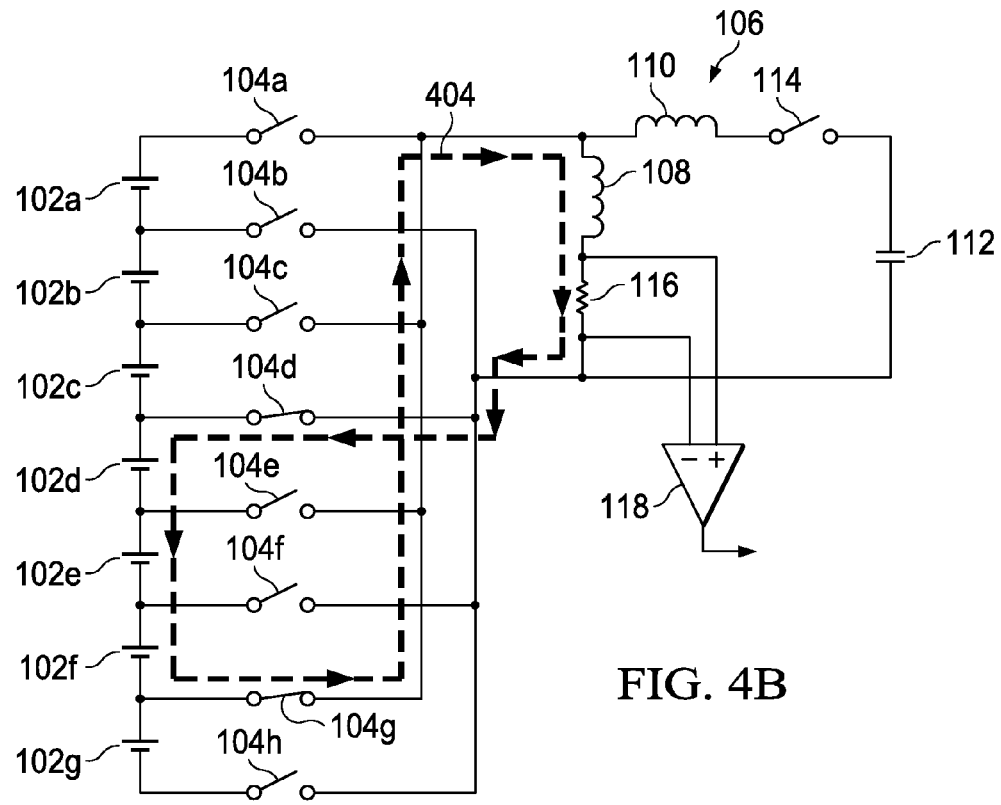

FIGS. 4A and 4B illustrate example operations of the system 100 of FIG. 1 during power transfers involving multiple discharged power supplies and multiple charged power supplies in accordance with this disclosure. In this particular example, power is transferred from power supplies 102a-102c to power supplies 102d-102f. The opening and closing of the switches 104a-104h here is controlled by the controller 120.

As shown in FIG. 4A, in order to transfer energy out of the power supplies 102a-102c, the switches 104a, 104d are closed, while the remaining switches 104b-104c, 104e-104h are opened. This creates a current path 402 through the power supplies 102a-102c. Also, the switch 114 is opened to disconnect the capacitor 112 from the current path 402. This causes current to flow from the connected power supplies 102a-102c to the inductor 108, charging the inductor 108.

As shown in FIG. 4B, in order to transfer energy from the inductor 108 to the power supplies 102d-102f, the switches 104d and 104g are closed, while the remaining switches 104a-104c, 104e-104f, 104h are opened. This creates a current path 404 through the power supplies 102d-102f. Also, the switch 114 remains opened. This causes current to flow from the inductor 108 to the connected power supplies 102d-102f, charging those power supplies 102d-102f.

Although FIGS. 2A through 4B illustrate examples of the operations of the system 100 of FIG. 1 during different power transfers, various changes may be made to FIGS. 2A through 4B. For example, these figures illustrate transfers between specific power supplies. Clearly, transfers between other power supplies or collections of power supplies could occur. Also, different combinations of these operations could be performed to transfer power between power supplies. For instance, power could be transferred from a single power supply to multiple power supplies or from multiple power supplies to a single power supply (with or without the use of the capacitor 112). In addition, note that in the implementation shown here, power can be transferred from an odd number of power supplies to the inductor 108, and power can be transferred from the inductor 108 to an odd number of power supplies (since closing the switches around an even number of power supplies would short-circuit those supplies). However, additional switches could be used to enable power transfers to or from an even number of power supplies, although this involves use of a larger number of switches.

Figure 5:
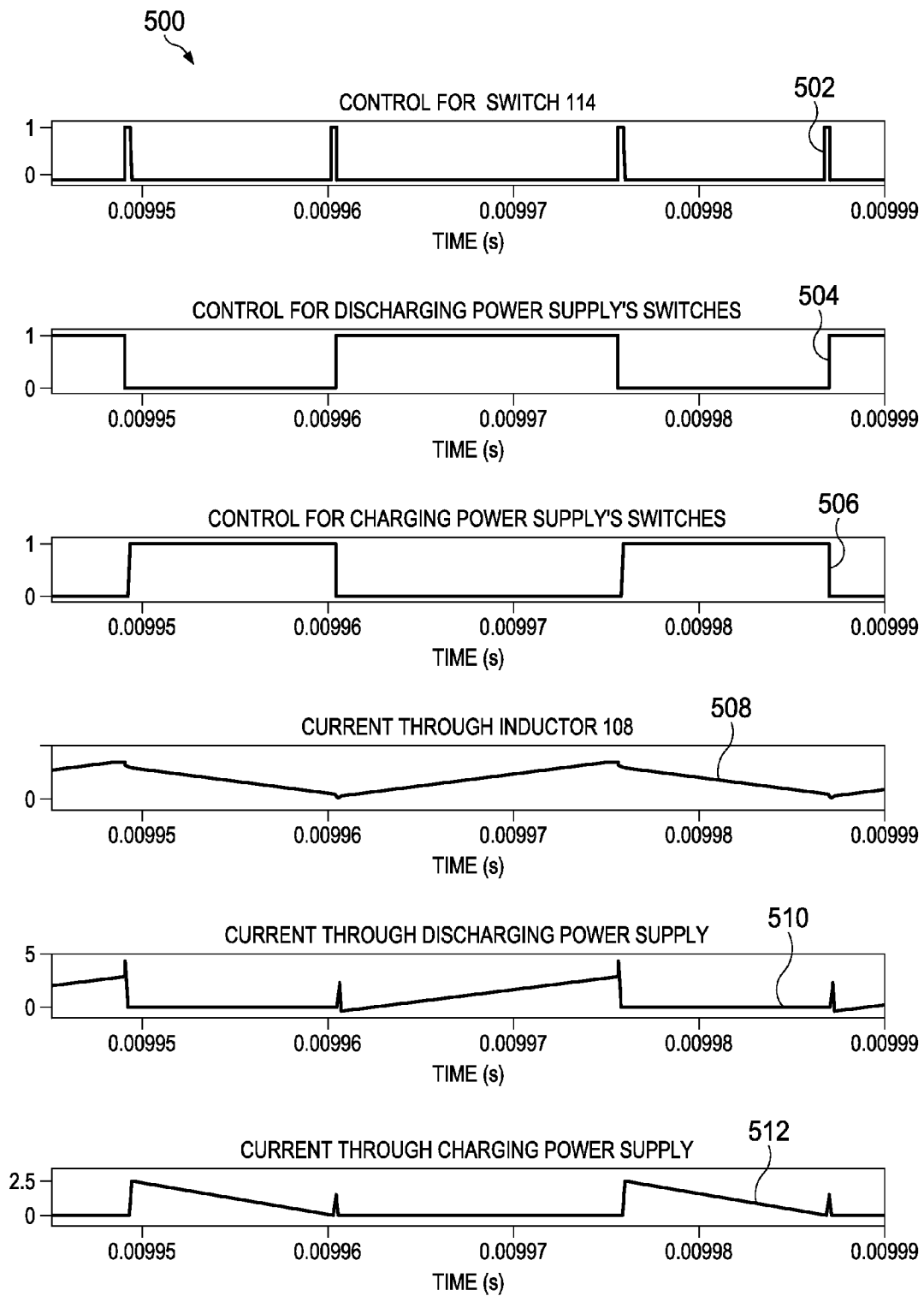
FIGS. 5 and 6 illustrate example timing diagrams associated with simulated operations in the system of FIG. 1 during power transfers in accordance with this disclosure.
Figure 6:
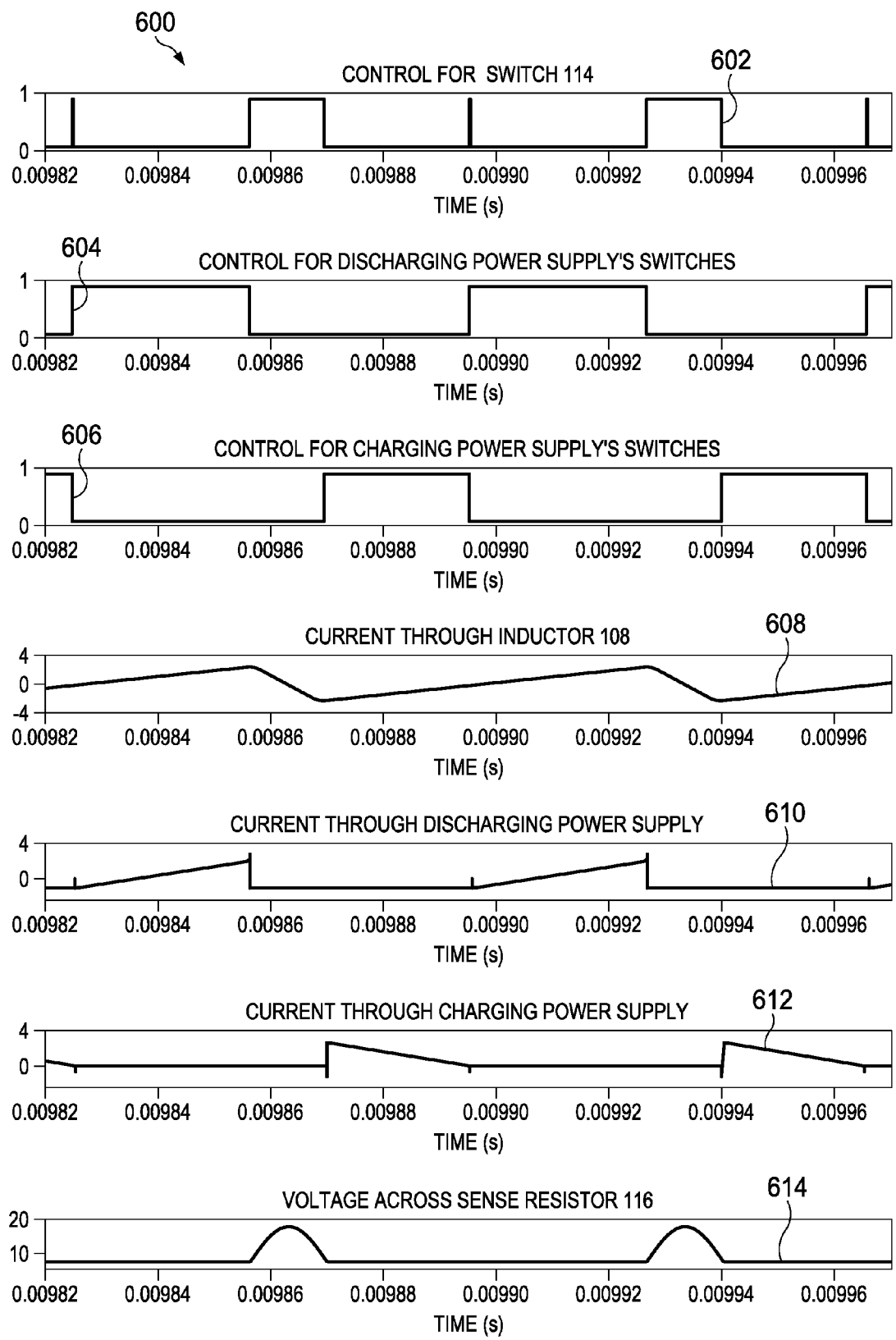

FIGS. 5 and 6 illustrate example timing diagrams associated with simulated operations in the system of FIG. 1 during power transfers in accordance with this disclosure. In FIG. 5, a timing diagram 500 is associated with an odd-to-even or even-to-odd power transfer. In FIG. 6, a timing diagram 600 is associated with an odd-to-odd or even-to-even power transfer. These simulations are based on hysteretic control, where inductor current is sensed directly.

As shown in FIG. 5, a line 502 represents the control signal provided to the switch 114. This control signal pulses high periodically but does not create a resonance between the inductors 108-110 and the capacitor 112. Line 504 represents the control signal provided to the switches associated with at least one power supply to be discharged. Line 506 represents the control signal provided to the switches associated with at least one power supply to be charged. As can be seen here, the line 504 goes high approximately when the line 506 goes low, and the line 504 goes low approximately when the line 506 goes high.

Line 508 represents the current through the inductor 108. Lines 510-512 represent the currents through the at least one discharging power supply and the at least one charging power supply, respectively. As can be seen here, the line 504 goes high and the line 506 goes low to transfer energy into the inductor 108, and the line 504 goes low and the line 506 goes high to transfer energy out of the inductor 108. The current through the inductor 108 increases during the time that the at least one discharging power supply is transferring energy to the inductor 108. The current through the inductor 108 decreases during the time that the at least one charging power supply is receiving energy from the inductor 108.

As shown in FIG. 6, a line 602 represents the control signal provided to the switch 114. Line 604 represents the control signal provided to the switches associated with at least one power supply to be discharged. Line 606 represents the control signal provided to the switches associated with at least one power supply to be charged. Line 608 represents the current through the inductor 108, and lines 610-612 represent the currents through the at least one discharging power supply and the at least one charging power supply, respectively. In addition, line 614 represents the voltage across the sense resistor 116.

As can be seen here, line 602 goes high between the line 604 going low (when the charging of the inductor 108 ends) and the line 606 going high (when the discharging of the inductor 108 begins). During this time period, the direction of current flow through the inductor 108 is reversed using the resonance created between the inductors 108-110 and the capacitor 112.

Although FIGS. 5 and 6 illustrate examples of timing diagrams associated with simulated operations in the system 100 of FIG. 1 during power transfers, various changes may be made to FIGS. 5 and 6. For example, these timing diagrams are for illustration only, and the waveforms shown here could vary depending on the specific implementation of a given circuit. As particular examples, the various pulse widths and pulses heights shown here in the signals could vary.

Figure 7:
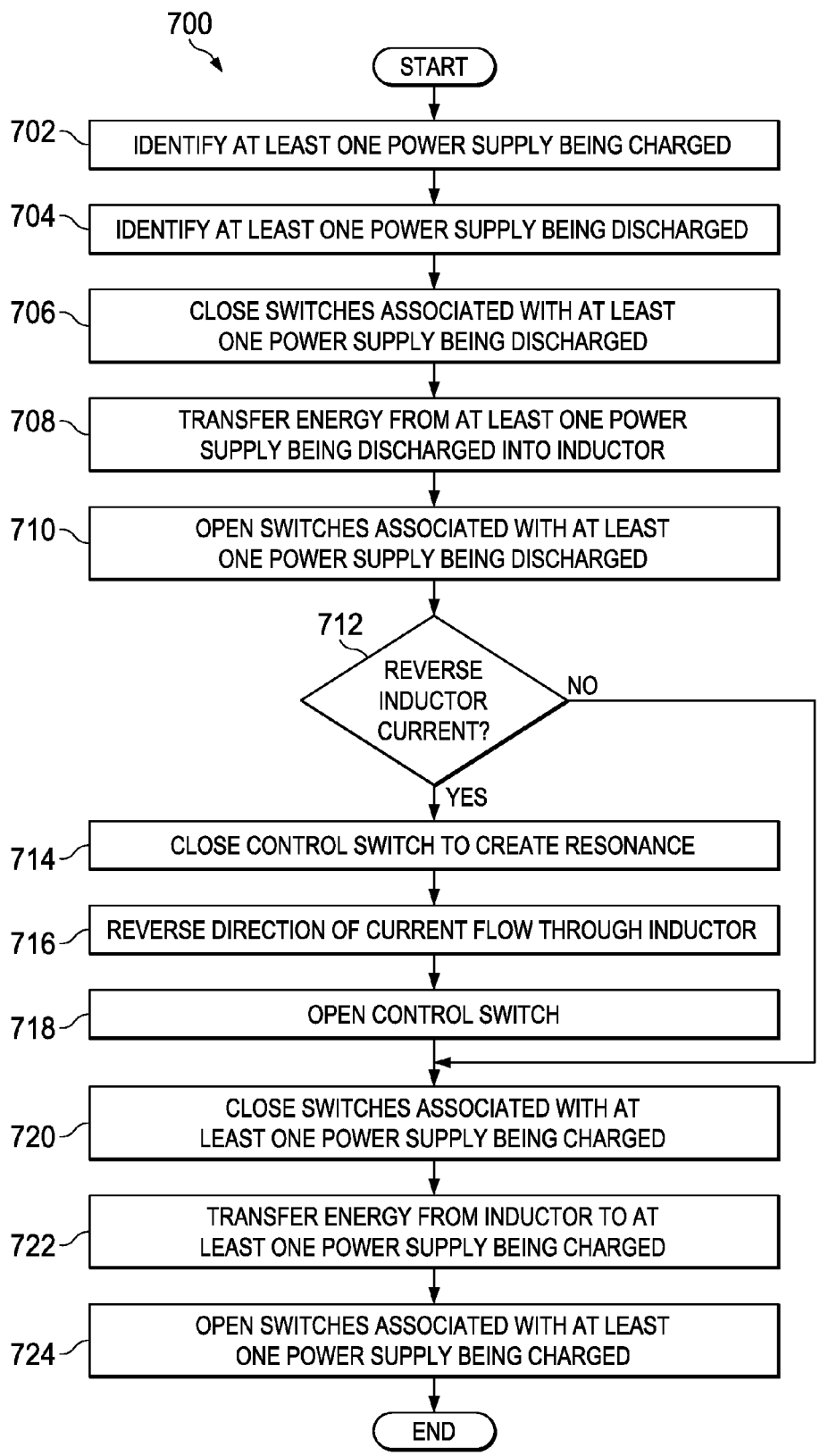
FIG. 7 illustrates an example method for inductor-based active balancing for batteries and other power supplies in accordance with this disclosure.

FIG. 7 illustrates an example method 700 for inductor-based active balancing for batteries and other power supplies in accordance with this disclosure. As shown in FIG. 7, at least one power supply to be charged is identified at step 702, and at least one power supply to be discharged is identified at step 704. This could include, for example, the controller 120 identifying the power supply or supplies 102a-102g having the highest output voltage(s) and identifying the power supply or supplies 102a-102g having the lowest output voltage(s).

The switches associated with the at least one power supply being discharged are closed at step 706. This could include, for example, the controller 120 closing the pair of switches around the power supply or power supplies 102a-102g having the highest output voltage(s). Energy is transferred from the at least one power supply being discharged to an inductor at step 708. This could include, for example, the power supply or power supplies 102a-102g having the highest output voltage(s) transferring at least some of their energy to the inductor 108. The switches associated with the at least one power supply being discharged are opened at step 710. This stops the transfer of energy to the inductor 108.

A decision is made whether the current path through the inductor needs to be reversed at step 712. This could include, for example, the controller 120 determining whether the power transfer involves an odd-to-odd or even-to-even transfer. If so, a control switch is closed to create a resonance with the inductor at step 714. This could include, for example, the controller 120 closing the switch 114 to create a resonance between the inductors 108-110 and the capacitor 112. This reverses the direction of the current flow through the inductor at step 716. This could include, for example, transferring at least some of the energy from the inductor 108 to the capacitor 112 and then back to the inductor 108. The control switch is opened at step 718.

The switches associated with the at least one power supply being charged are closed at step 720. This could include, for example, the controller 120 closing the pair of switches around the power supply or power supplies 102a-102g having the lowest output voltage(s). Energy is transferred from the inductor to the at least one power supply being charged at step 722. This could include, for example, the inductor 108 transferring at least some of its stored energy to the power supply or power supplies 102a-102g having the lowest output voltage(s). The switches associated with the at least one power supply being charged are opened at step 724. This stops the transfer of energy from the inductor 108.

In this way, the method 700 supports the direct balancing of energy between power supplies without the need for an energy buffer, which can lead to higher balancing efficiency. Moreover, this approach requires fewer components to implement compared to conventional balancing approaches, and a wide variety of algorithms can be used to select the power supplies to be charged and discharged.

Although FIG. 7 illustrates one example of a method 700 for inductor-based active balancing for batteries and other power supplies, various changes may be made to FIG. 7. For example, while shown as a series of steps, various steps in FIG. 7 could overlap, occur in parallel, occur in a different order, or occur multiple times. As a particular example, the method 700 could be performed repeatedly for different combinations of power supplies until all of the power supplies have substantially equal output voltages.

Note that the system 100 shown above could be used in any type of system in which active balancing of power supplies is required or desired. For instance, the system 100 could be used with the power supplies in electric vehicles or hybrid electric vehicles, such as to balance lithium ion batteries or other types of batteries. Any other device or system that uses multiple power supplies could also include the system 100. Also note that any particular values (such as inductances, capacitances, resistances, and efficiencies) given above may represent exact or approximate values and are related to specific implementations of a circuit.

It may be advantageous to set forth definitions of certain words and phrases that have been used within this patent document. The term "couple" and its derivatives refer to any direct or indirect communication between components, whether or not those components are in physical contact with each other. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A circuit to control active balancing in a system with four or more power supplies in series, the system including an LC resonance circuit with an energy transfer inductor and a capacitor, and a resonator switch controlled to selectively connect the energy transfer inductor to the capacitor as a resonator, the system further including a switch network to selectively couple the energy transfer inductor to a respective one of the power supplies, the circuit comprising:
a controller coupleable to the resonator switch and to the switch network;
the controller configured to generate switch signals to selectively switch the switch network and the resonator switch to transfer energy from a selected first power supply to a selected second power supply based on:
a discharge cycle in which the selected first power supply is parallel-connected to the inductor to transfer energy from the first power supply to the inductor, followed selectively by either
an odd-odd/even-even charge cycle in which the inductor is series-connected to the second power supply to transfer energy from the inductor to the second power supply, or
an odd-even/even-odd charge cycle in which
the resonator switch is closed to selectively configure the inductor and the capacitor as a resonator circuit to reverse a direction of current flow through the inductor, and then
the inductor is parallel-connected to the second power supply to transfer energy from the inductor to the second power supply.

2. The circuit of claim 1,
wherein the number of series-connected power supplies is n and the number of switches in the switch network is n+1; and
wherein a first end of the inductor is connected to odd-numbered switches, and a second end of the inductor is connected to even-numbered switches.

3. The circuit of claim 1, wherein, the controller is configured to generate switch signals to control the switch network and the resonator switch to transfer energy from the first power supply to the second power supply, including
to close a first pair of switches to transfer the energy from the first power supply to the inductor;
to open the first pair of switches; and
to close a second pair of switches to transfer the energy from the inductor to the second power supply.

4. The circuit of claim 1, wherein, the controller is configured to generate switch signals to transfer energy from the first power supply to the second power supply, including:
to close a first pair of switches to transfer the energy from the first power supply to the inductor;
to open the first pair of switches;
to close the resonator switch to configure the resonator circuit and reverse the direction of the current flow through the inductor;
to open the resonator switch; and
to close a second pair of switches to transfer the energy from the inductor to the second power supply.

5. The circuit of claim 1, wherein, the controller is configured to generate switch signals to transfer the energy between a first group of the power supplies and a second group of the power supplies, including:
to close a first pair of switches to transfer the energy from the first group of power supplies to the inductor;
to open the first pair of switches; and
to close a second pair of switches to transfer the energy from the inductor to the second group of power supplies.

6. The circuit of claim 1, wherein:
the inductor comprises a first inductor; and
the LC resonance circuit further comprises a second inductor coupled in parallel with the first inductor.

7. The circuit of claim 6, wherein:
the first inductor is coupled in series with a sense resistor;
the capacitor and the resonator switch are coupled in series with the second inductor; and
the capacitor, the resonator switch, and the second inductor are coupled in parallel with the first inductor and the sense resistor.

8. A method of active power supply balancing by transferring energy among four or more power supplies connected in series using a selectively configurable LC resonator with an energy transfer inductor and a capacitor, and a resonator switch controlled to selectively connect the inductor to the capacitor, and using a selectively configurable switch network coupled to the power supplies and to the energy transfer inductor, comprising:
transferring energy from a selected first power supply to a selected second power supply by selectively controlling the resonator switch and the switch network, and:
performing a discharge cycle by connecting the selected first power supply in parallel with the inductor to transfer energy from the first power supply to the inductor, followed selectively by either
performing an odd-odd/even-even charge cycle by connecting the inductor in series with the second power supply to transfer energy from the inductor to the second power supply, or
performing an odd-even/even-odd charge cycle by
closing the resonator switch to selectively configure the inductor and the capacitor as a resonator circuit to reverse a direction of current flow through the inductor, and then
connecting the inductor in parallel with the second power supply to transfer energy from the inductor to the second power supply.

9. The method of claim 8, wherein:
transferring the energy from the first power supply to the inductor comprises selectively controlling a first pair of switches;
transferring the energy from the inductor to the second power supply comprises selectively controlling a second pair of switches.

10. The method of claim 9, wherein:
performing the discharge cycle comprises closing the first pair of switches to transfer the energy from the first power supply to the inductor; and
performing the odd-odd/even-even charge cycle comprises:
opening the first pair of switches; and
closing the second pair of switches to connect the inductor in series with the second power supply to transfer the energy from the inductor to the second power supply.

11. The method of claim 9, wherein transferring the energy from the first power supply to the inductor, selectively configuring the inductor and the capacitor as a resonator circuit, and transferring the energy from the inductor to the second power supply comprise:
performing the discharge cycle comprises closing the first pair of switches to transfer the energy from the first power supply to the inductor; and performing the odd-even/even-odd charge cycle comprises:
opening the first pair of switches;
closing the resonator switch to configure the inductor and the capacitor as a resonator circuit and reverse the direction of the current flow through the inductor;
opening the resonator switch; and
closing the second pair of switches to connect the inductor in parallel with the second power supply to transfer the energy from the inductor to the second power supply.

12. The method of claim 8, wherein energy is transferred between a first group of power supplies and a second group of power supplies by:
closing a first pair of switches to transfer the energy from the first group of power supplies to the inductor;
opening the first pair of switches; and
closing a second pair of switches to transfer the energy from the inductor to the second group of power supplies.

13. A circuit to control active balancing in a system with four or more power supplies in series, and with a switch network coupled to the power supplies, the circuit comprising:
an LC resonance circuit, including
an energy transfer inductor,
a capacitor, and
a resonator switch configured to selectively connect the inductor to the capacitor as a resonator circuit;
a controller coupled to the energy transfer inductor, and coupleable to the switch network;
the controller operable to selectively control the switch network and the resonator switch to transfer energy from a selected first power supply to a selected second power supply based on:
a discharge cycle in which the selected first power supply is parallel-connected to the inductor to transfer energy from the first power supply to the capacitor, followed selectively by either;
an odd-odd/even-even charge cycle in which the inductor is series-connected to the second power supply to transfer energy from the inductor to the second power supply, or
an odd-even/even-odd charge cycle in which
the resonator switch is closed to selectively configure the inductor and the capacitor as a resonator circuit to reverse a direction of current flow through the inductor, and then
the inductor is parallel-connected to the second power supply to transfer energy from the inductor to the second power supply.

14. The circuit of claim 13,
wherein the number of series-connected power supplies is n and the number of switches in the switch network is n+1; and
wherein a first end of the inductor is connected to odd-numbered switches, and a second end of the inductor is connected to even-numbered switches.

15. The circuit of claim 13, wherein, to transfer energy from the first power supply to the second power supply, the controller is operable to generate switch signals to:
close a first pair of switches to transfer the energy from the first power supply to the inductor;
open the first pair of switches; and
close a second pair of switches to transfer the energy from the inductor to the second power supply.

16. The circuit of claim 13, wherein, to transfer energy from the first power supply to the second power supply, the controller is operable to generate switch signal to:
close a first pair of switches to transfer the energy from the first power supply to the inductor;
open the first pair of switches;
close the resonator switch to configure the inductor and the capacitor as a resonator circuit and reverse the direction of the current flow through the inductor;
open the resonator switch; and
close a second pair of switches to transfer the energy from the inductor to the second power supply.

17. The circuit of claim 13, wherein, to transfer the energy between a first group of the power supplies and a second group of the power supplies, the controller is operable to generate switch signals to:
close a first pair of switches to transfer the energy from the first group of power supplies to the inductor;
open the first pair of switches; and
close a second pair of switches to transfer the energy from the inductor to the second group of power supplies.

18. The circuit of claim 13, wherein:
the inductor comprises a first inductor;
the LC resonance circuit further comprises a sense resistor and a second inductor;
the first inductor is coupled in series with the sense resistor;
the capacitor and the resonator switch are coupled in series with the second inductor; and
the capacitor, the resonator switch, and the second inductor are coupled in parallel with the first inductor and the sense resistor.

* * * * *